(12) United States Patent
Zones et al.

(10) Patent No.: US 9,193,600 B1
(45) Date of Patent: Nov. 24, 2015

(54) METHOD FOR MAKING MOLECULAR SIEVE SSZ-99

(71) Applicants: Stacey Ian Zones, San Francisco, CA (US); Dan Xie, Richmond, CA (US); Cong-Yan Chen, Kensington, CA (US); Ann Jia-Bao Liang, Walnut Creek, CA (US)

(72) Inventors: Stacey Ian Zones, San Francisco, CA (US); Dan Xie, Richmond, CA (US); Cong-Yan Chen, Kensington, CA (US); Ann Jia-Bao Liang, Walnut Creek, CA (US)

(73) Assignee: Chevron U. S. A. Inc., San Ramon, CA (US)

( * ) Notice: Subject to any disclaimer, the term of this patent is extended or adjusted under 35 U.S.C. 154(b) by 66 days.

(21) Appl. No.: 14/296,370

(22) Filed: Jun. 4, 2014

(51) Int. Cl.
| | |
|---|---|
| *C01B 39/48* | (2006.01) |
| *B01J 29/70* | (2006.01) |
| *B01J 20/18* | (2006.01) |
| *B01J 20/30* | (2006.01) |
| *B01J 37/03* | (2006.01) |
| *B01J 35/02* | (2006.01) |

(52) U.S. Cl.
CPC ............. *C01B 39/48* (2013.01); *B01J 20/18* (2013.01); *B01J 20/3057* (2013.01); *B01J 29/70* (2013.01); *B01J 35/02* (2013.01); *B01J 37/038* (2013.01); *C01P 2002/72* (2013.01)

(58) Field of Classification Search
CPC ....... C01B 39/48; C01P 2002/72; B01J 29/70
See application file for complete search history.

(56) References Cited

U.S. PATENT DOCUMENTS

| 2,692,285 A | 10/1954 | Robinson | |
|---|---|---|---|
| 8,999,288 B1 * | 4/2015 | Elomari | B01J 20/186 423/700 |
| 9,108,856 B2 * | 8/2015 | Elomari | C01B 39/48 |
| 2001/0022961 A1 * | 9/2001 | Lee | B01D 53/02 423/718 |
| 2008/0107594 A1 * | 5/2008 | Cao | B01D 53/1493 423/706 |
| 2009/0048473 A1 * | 2/2009 | Corma | C01B 37/005 585/276 |
| 2011/0166402 A1 * | 7/2011 | Roth | B01J 29/70 585/422 |
| 2012/0160773 A1 * | 6/2012 | Strohmaier | B01J 20/18 210/660 |
| 2015/0266007 A1 * | 9/2015 | Mancka | B01J 29/70 502/60 |

FOREIGN PATENT DOCUMENTS

| WO | 2010065319 | 6/2010 |
|---|---|---|
| WO | 2010088243 | 8/2010 |

OTHER PUBLICATIONS

PCT International Search Report, PCT/US2015/016506, mailed May 19, 2015.
J. Su, Y. Wang, J. Lin, J. Liang, J. Sun and X. Zou "A silicogermanate with 20-ring channels directed by a simple quaternary ammonium cation" Dalton Trans. 2013, 42, 1360-1363.

* cited by examiner

*Primary Examiner* — David M Brunsman
(74) *Attorney, Agent, or Firm* — Terrence M. Flaherty

(57) ABSTRACT

A method for making a new crystalline molecular sieve designated SSZ-99 is disclosed. SSZ-99 is synthesized using a methylethyldiisopropylammonium cation as a structure directing agent.

11 Claims, 2 Drawing Sheets

METHOD FOR MAKING MOLECULAR SIEVE SSZ-99

TECHNICAL FIELD

This disclosure relates a new molecular sieve designated SSZ-99, a method for preparing SSZ-99 using a methylethyldiisopropylammonium cation as a structure directing agent, and uses for SSZ-99.

BACKGROUND

Molecular sieve materials, both natural and synthetic, have been demonstrated in the past to be useful as adsorbents and to have catalytic properties for various types of hydrocarbon conversion reactions. Certain molecular sieves, such as zeolites, aluminophosphates, and mesoporous materials, are ordered, porous crystalline materials having a definite crystalline structure as determined by X-ray diffraction (XRD). Within the crystalline molecular sieve material there are a large number of cavities which may be interconnected by a number of channels or pores. These cavities and pores are uniform in size within a specific molecular sieve material. Because the dimensions of these pores are such as to accept for adsorption molecules of certain dimensions while rejecting those of larger dimensions, these materials have come to be known as "molecular sieves" and are utilized in a variety of industrial processes.

Although many different crystalline molecular sieves have been discovered, there is a continuing need for new molecular sieves with desirable properties for gas separation and drying, hydrocarbon conversion reactions, and other applications. New molecular sieves can contain novel internal pore architectures, providing enhanced selectivities in these processes.

SUMMARY

The present disclosure is directed to a new family of molecular sieves with unique properties, referred to herein as "molecular sieve SSZ-99" or simply "SSZ-99."

In one aspect, there is provided a molecular sieve having a mole ratio of from 5 to 50 of (1) at least one oxide of at least one tetravalent element to (2) one or more oxides selected from the group consisting of oxides of trivalent elements, pentavalent elements, and mixtures thereof, and having, in its as-synthesized form, the X-ray diffraction lines of Table 5.

In another aspect, there is provided a method of preparing a crystalline molecular sieve by contacting under crystallization conditions (1) at least one source of at least one oxide of a tetravalent element; (2) one or more sources of one or more oxides selected from the group consisting of oxides of trivalent elements, pentavalent elements, and mixtures thereof; (3) at least one source of an element selected from Groups 1 and 2 of the Periodic Table; (4) hydroxide ions; and (5) a methylethyldiisopropylammonium cation.

In yet another aspect, there is provided a process for preparing a crystalline molecular sieve having, in its as-synthesized form, the X-ray diffraction lines of Table 5, by: (a) preparing a reaction mixture containing: (1) at least one source of at least one oxide of a tetravalent element; (2) one or more sources of one or more oxides selected from the group consisting of oxides of trivalent elements, pentavalent elements, and mixtures thereof; (3) at least one source of an element selected from Groups 1 and 2 of the Periodic Table; (4) hydroxide ions; (5) a methylethyldiisopropylammonium cation, and (6) water; and (b) subjecting the reaction mixture to crystallization conditions sufficient to form crystals of the molecular sieve.

The present disclosure also provides SSZ-99 having a composition, as-synthesized and in the anhydrous state, in terms of mole ratios, as follows:

|          | Broad         | Exemplary     |
|----------|---------------|---------------|
| $TO_2/X_2O_b$ | 5 to 50       | 5 to 30       |
| $Q/TO_2$ | 0.02 to 0.10  | 0.02 to 0.10  |
| $M/TO_2$ | 0.02 to 0.15  | 0.02 to 0.15  | wherein (1) T is selected from the group consisting of tetravalent elements from Groups 4-14 of the Periodic Table, and mixtures thereof; (2) X is selected from the group consisting of trivalent and pentavalent elements from Groups 3-13 of the Periodic Table, and mixtures thereof; (3) stoichiometric variable b equals the valence of compositional variable X (e.g., when X is trivalent, b=3; when X is pentavalent, b=5); (4) Q is a methylethyldiisopropylammonium cation; and (5) M is selected from the group consisting of elements from Groups 1 and 2 of the Periodic Table.

DETAILED DESCRIPTION

Introduction

Figure 1:
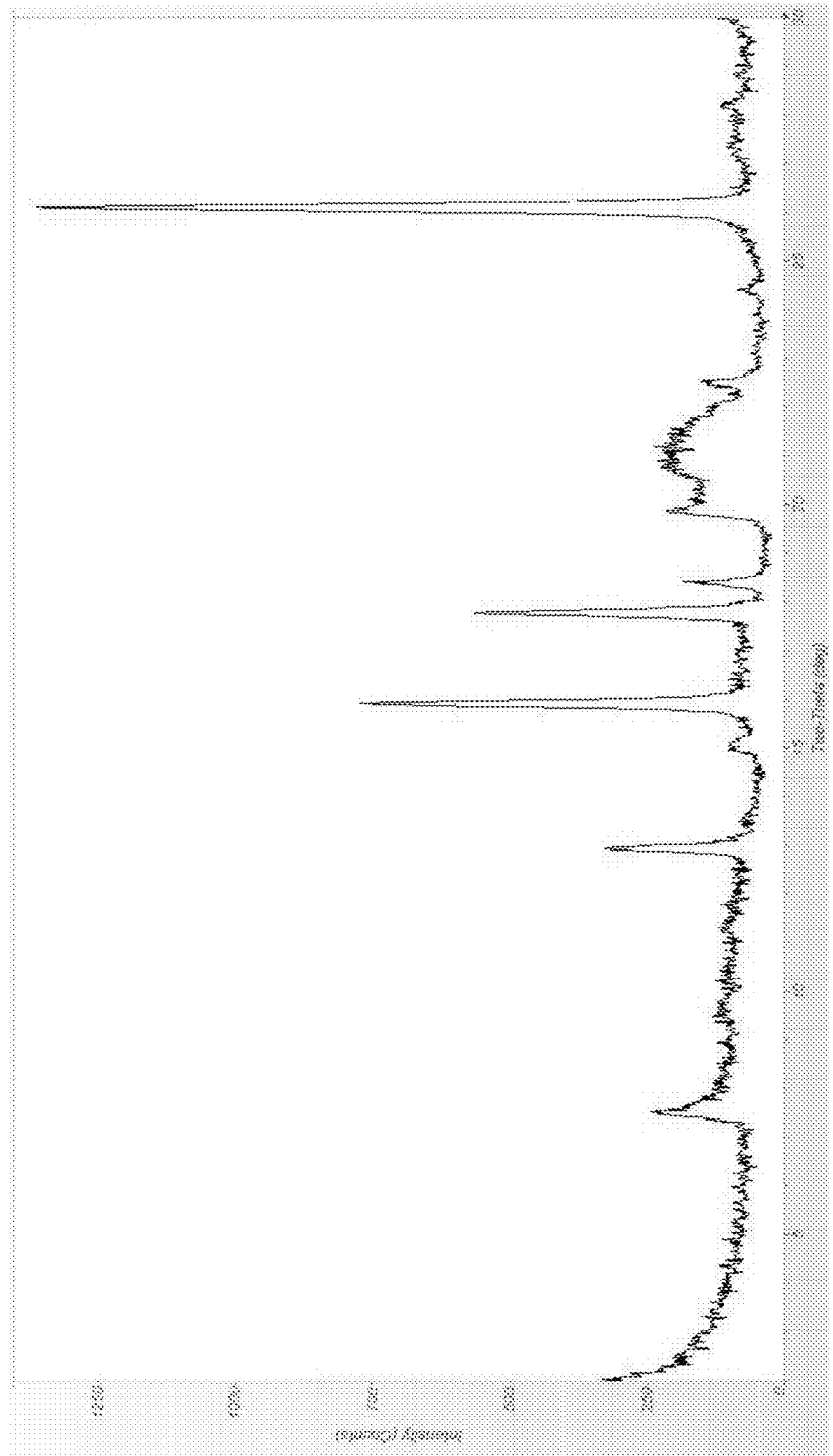
FIG. 1 is a powder XRD pattern of the as-synthesized molecular sieve prepared in Example 1.

The term "molecular sieve" includes (a) intermediate and (b) final or target molecular sieves and molecular sieves produced by (1) direct synthesis or (2) post-crystallization treatment (secondary synthesis). Secondary synthesis techniques allow for the synthesis of a target material from an intermediate material by heteroatom lattice substitution or other techniques. For example, an aluminosilicate can be synthesized from an intermediate borosilicate by post-crystallization heteroatom lattice substitution of the boron for aluminum. Such techniques are known, for example as described in U.S. Pat. No. 6,790,433.

As used herein, the numbering scheme for the Periodic Table Groups is as disclosed in *Chem. Eng. News*, 63(5), 27 (1985).

In preparing SSZ-99, a methylethyldiisopropylammonium cation is used as a structure directing agent ("SDA"), also known as a crystallization template. The SDA useful for making SSZ-99 is represented by the following structure (1):

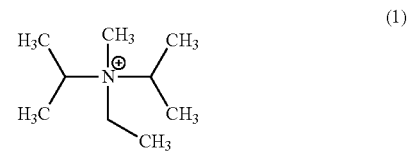

The SDA cation is associated with anions which can be any anion that is not detrimental to the formation of the molecular sieve. Representative anions include elements from Group 17 of the Periodic Table (e.g., fluoride, chloride, bromide and iodide), hydroxide, acetate, sulfate, tetrafluoroborate, carboxylate, and the like.

Reaction Mixture

In general, SSZ-99 is prepared by: (a) preparing a reaction mixture containing (1) at least one source of an oxide of at least one tetravalent element; (2) one or more sources of one or more oxides selected from the group consisting of oxides of trivalent elements, pentavalent elements, and mixtures thereof; (3) at least one source of an element selected from Groups 1 and 2 of the Periodic Table; (4) hydroxide ions; (5) a methylethyldiisopropylammonium cation; and (6) water; and (b) subjecting the reaction mixture to crystallization conditions sufficient to form crystals of the molecular sieve.

The composition of the reaction mixture from which the molecular sieve is formed, in terms of mole ratios, is identified in Table 1 below, wherein compositional variables T, X, M and Q and stoichiometric variable b are as described herein above.

TABLE 1

| Components | Broad | Exemplary |
|---|---|---|
| $TO_2/X_2O_b$ | 5 to 50 | 5 to 50 |
| $M/TO_2$ | 0.01 to 1.0 | 0.30 to 0.80 |
| $Q/TO_2$ | 0.05 to 0.50 | 0.10 to 0.30 |
| $OH/TO_2$ | 0.10 to 1.0 | 0.30 to 0.80 |
| $H_2O/TO_2$ | 10 to 100 | 20 to 50 |

In one sub-embodiment, the composition of the reaction mixture from which SSZ-99 is formed, in terms of mole ratios, is identified in Table 2 below, wherein compositional variables M and Q are as described herein above.

TABLE 2

| Components | Broad | Exemplary |
|---|---|---|
| $SiO_2/Al_2O_3$ | 5 to 50 | 5 to 50 |
| $M/SiO_2$ | 0.01 to 1.0 | 0.30 to 0.80 |
| $Q/SiO_2$ | 0.05 to 0.50 | 0.10 to 0.30 |
| $OH/SiO_2$ | 0.10 to 1.0 | 0.30 to 0.80 |
| $H_2O/SiO_2$ | 10 to 100 | 20 to 50 |

As noted above, for each embodiment described herein, T is selected from the group consisting of tetravalent elements from Groups 4-14 of the Periodic Table. In one sub-embodiment, T is selected from the group consisting of silicon (Si), germanium (Ge), titanium (Ti), and mixtures thereof. In another sub-embodiment, T is selected from the group consisting of Si, Ge, and mixtures thereof. In one sub-embodiment, T is Si. Sources of elements selected for composition variable T include oxides, hydroxides, acetates, oxalates, ammonium salts and sulfates of the element(s) selected for T. In one sub-embodiment, each source(s) of the element(s) selected for compositional variable T is an oxide. Where T is Si, sources useful for Si include fumed silica, precipitated silicates, silica hydrogel, silicic acid, colloidal silica, tetraalkyl orthosilicates (e.g., tetraethyl orthosilicate), and silica hydroxides. Sources useful herein for Ge include germanium oxide and germanium ethoxide.

For each embodiment described herein, X is selected from the group consisting of trivalent and pentavalent elements from Groups 3-13 of the Periodic Table. In one sub-embodiment, X is selected from the group consisting of boron (B), aluminum (Al), gallium (Ga), indium (In), iron (Fe), and mixtures thereof. In another sub-embodiment, X is selected from the group consisting of B, Al, Ga, In, and mixtures thereof. In one sub-embodiment X is Al. Sources of elements selected for compositional variable X include oxides, hydroxides, acetates, oxalates, ammonium salts and sulfates of the element(s) selected for X. Where X is Al, sources useful for Al include aluminates, alumina, and aluminum compounds such as $AlCl_3$, $Al_2(SO_4)_3$, $Al(OH)_3$, kaolin clays, and other zeolites. An example of the source of aluminum oxide is Na—Y zeolite. Boron, gallium, indium, titanium, and iron can be added in forms corresponding to their aluminum and silicon counterparts.

As described herein above, for each embodiment described herein, the reaction mixture can be formed using at least one source of an element selected from Groups 1 and 2 of the Periodic Table (referred to herein as M). In one sub-embodiment, the reaction mixture is formed using a source of an element from Group 1 of the Periodic Table. In another sub-embodiment, the reaction mixture is formed using a source of sodium (Na). Any M-containing compound which is not detrimental to the crystallization process is suitable. Sources for such Groups 1 and 2 elements include oxides, hydroxides, nitrates, sulfates, halides, oxalates, citrates and acetates thereof.

For each embodiment described herein, the molecular sieve reaction mixture can be supplied by more than one source. Also, two or more reaction components can be provided by one source.

The reaction mixture can be prepared either batch wise or continuously. Crystal size, morphology and crystallization time of the molecular sieve described herein can vary with the nature of the reaction mixture and the crystallization conditions.

Crystallization and Post-Synthesis Treatment

In practice, the molecular sieve is prepared by: (a) preparing a reaction mixture as described herein above; and (b) subjecting the reaction mixture to crystallization conditions sufficient to form crystals of the molecular sieve.

The reaction mixture is maintained at an elevated temperature until the crystals of the molecular sieve are formed. The hydrothermal crystallization is usually conducted under pressure, and usually in an autoclave so that the reaction mixture is subject to autogenous pressure, at a temperature between 125° C. and 200° C.

The reaction mixture can be subjected to mild stirring or agitation during the crystallization step. It will be understood by the skilled artisan that the molecular sieves described herein can contain impurities, such as amorphous materials, unit cells having framework topologies which do not coincide with the molecular sieve, and/or other impurities (e.g., organic hydrocarbons).

During the hydrothermal crystallization step, the molecular sieve crystals can be allowed to nucleate spontaneously from the reaction mixture. The use of crystals of the molecular sieve as seed material can be advantageous in decreasing the time necessary for complete crystallization to occur. In addition, seeding can lead to an increased purity of the product obtained by promoting the nucleation and/or formation of the molecular sieve over any undesired phases. When used as seeds, seed crystals are added in an amount between 1% and 10% of the weight of the source for compositional variable T used in the reaction mixture.

Once the molecular sieve crystals have formed, the solid product is separated from the reaction mixture by standard mechanical separation techniques such as filtration. The crystals are water-washed and then dried to obtain the as-synthesized molecular sieve crystals. The drying step can be performed at atmospheric pressure or under vacuum.

The molecular sieve can be used as-synthesized, but typically will be thermally treated (calcined). The term "as-synthesized" refers to the molecular sieve in its form after crystallization, prior to removal of the SDA cation. The SDA can be removed by thermal treatment (e.g., calcination), preferably in an oxidative atmosphere (e.g., air, gas with an oxygen partial pressure of greater than 0 kPa) at a temperature readily determinable by the skilled artisan sufficient to remove the SDA from the molecular sieve. The SDA can also be removed by photolysis techniques (e.g., exposing the SDA-containing molecular sieve product to light or electromagnetic radiation that has a wavelength shorter than visible light under conditions sufficient to selectively remove the organic compound from the molecular sieve) as described in U.S. Pat. No. 6,960,327.

The molecular sieve can subsequently be calcined in steam, air or inert gas at temperatures ranging from 200° C. to 800° C. for periods of time ranging from 1 to 48 hours, or more. Usually, it is desirable to remove the extra-framework cation (e.g., $Na^+$) by ion exchange and replace it with hydrogen, ammonium, or any desired metal-ion.

Where the molecular sieve formed is an intermediate material, the target molecular sieve can be achieved using post-synthesis techniques such as heteroatom lattice substitution techniques. The target molecular sieve can also be achieved by removing heteroatoms from the lattice by known techniques such as acid leaching.

The molecular sieve made from the process disclosed herein can be formed into a wide variety of physical shapes. Generally speaking, the molecular sieve can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the molecular sieve can be extruded before drying or dried (or partially dried) and then extruded.

The molecular sieve can be composited with other materials resistant to the temperatures and other conditions employed in organic conversion processes. Such matrix materials include active and inactive materials and synthetic or naturally occurring zeolites as well as inorganic materials such as clays, silica and metal oxides. Examples of such materials and the manner in which they can be used are disclosed in U.S. Pat. Nos. 4,910,006 and 5,316,753.

Characterization of the Molecular Sieve

Molecular sieves made by the process disclosed herein have a composition, as-synthesized and in the anhydrous state, as described in Table 3 (in terms of mole ratios), wherein compositional variables T, X, Q and M and stoichiometric variable b are as described herein above:

TABLE 3

|  | Broad | Exemplary |
|---|---|---|
| $TO_2/X_2O_b$ | 5 to 50 | 5 to 30 |
| $Q/TO_2$ | 0.02 to 0.10 | 0.02 to 0.10 |
| $M/TO_2$ | 0.02 to 0.15 | 0.02 to 0.15 |

In one sub-embodiment, the molecular sieves made by the process disclosed herein have a composition, as-synthesized and in the anhydrous state, as described in Table 4 (in terms of mole ratios), wherein compositional variables Q and M are as described herein above:

TABLE 4

|  | Broad | Exemplary |
|---|---|---|
| $SiO_2/Al_2O_3$ | 5 to 50 | 5 to 30 |
| $Q/SiO_2$ | 0.02 to 0.10 | 0.02 to 0.10 |
| $M/SiO_2$ | 0.02 to 0.15 | 0.02 to 0.15 |

Molecular sieves synthesized by the process disclosed herein are characterized by their XRD pattern. The powder XRD pattern lines of Table 5 are representative of as-synthesized SSZ-99 made in accordance with the present disclosure. Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation. Calcination can also cause minor shifts in the XRD pattern. Notwithstanding these minor perturbations, the basic crystal lattice structure remains unchanged.

TABLE 5

Characteristic Peaks for As-Synthesized SSZ-99

| 2-Theta[a] | d-Spacing, nm | Relative Intensity[b] | Peak Broadening[c] | P/N[d] |
|---|---|---|---|---|
| 7.54 | 1.172 | M | B | L |
| 9.71 | 0.910 | W | VB | L |
| 12.94 | 0.684 | W | Sh | H |
| 14.97 | 0.591 | M | Sh | L |
| 15.92 | 0.556 | S | Sh | H |
| 17.78 | 0.499 | M | Sh | H |
| 18.40 | 0.482 | W | Sh | L |
| 19.86 | 0.447 | M | B | L |
| 21.26 | 0.418 | S | VB | L |
| 22.51 | 0.395 | W | B | L |
| 24.40 | 0.365 | W | Sh | L |
| 26.10 | 0.341 | VS | Sh | H |
| 27.35 | 0.326 | W | B | L |
| 28.17 | 0.317 | W | B | L |

[a] ±0.20
[b] The powder XRD patterns provided are based on a relative intensity scale in which the strongest line in the X-ray pattern is assigned a value of 100: W = weak (>0 to ≤20); M = medium (>20 to ≤40); S = strong (>40 to ≤60); VS = very strong (>60 to ≤100)
[c] Peak Broadening is characterized by the Full-Width at Half Maximum (FWHM) of the XRD peak. Based on the FWHM values, the peaks are classified as: Sh = sharp (≤2* smallest FWHM); B = broad (>2*smallest FWHM to ≤5* smallest FWHM); VB = very broad (≥5*smallest FWHM)
[d] P/N is the peak to noise ratio which is calculated as P/N = (Peak Height − Background)/√Peak Height. L = low (≤15); H = high (>15)

The X-ray diffraction pattern lines of Table 6 are representative of calcined SSZ-99 made in accordance with the present disclosure.

TABLE 6

Characteristic Peaks for Calcined SSZ-99

| 2-Theta[a] | d-Spacing, nm | Relative Intensity[b] | Peak Broadening[c] | P/N[d] |
|---|---|---|---|---|
| 7.47 | 1.183 | M | B | L |
| 9.75 | 0.907 | W | VB | L |
| 12.93 | 0.684 | M | Sh | H |
| 15.06 | 0.588 | W | Sh | L |
| 15.90 | 0.557 | VS | Sh | L |
| 17.82 | 0.497 | M | Sh | H |
| 18.39 | 0.482 | W | Sh | L |
| 19.86 | 0.447 | M | B | L |
| 21.38 | 0.415 | S | VB | L |
| 24.44 | 0.364 | W | Sh | L |
| 26.12 | 0.341 | VS | Sh | H |
| 27.17 | 0.328 | W | B | L |
| 28.22 | 0.316 | W | B | L |

[a] ±0.20
[b] The powder XRD patterns provided are based on a relative intensity scale in which the strongest line in the X-ray pattern is assigned a value of 100: W = weak (>0 to ≤20); M = medium (>20 to ≤40); S = strong (>40 to ≤60); VS = very strong (>60 to ≤100)
[c] Peak Broadening is characterized by the Full-Width at Half Maximum (FWHM) of the XRD peak. Based on the FWHM values, the peaks are classified as: Sh = sharp (≤2* smallest FWHM); B = broad (>2*smallest FWHM to ≤5* smallest FWHM); VB = very broad (≥5*smallest FWHM)
[d] P/N is the peak to noise ratio which is calculated as P/N = (Peak Height - Background)/√Peak Height. L = low (≤15); H = high (>15)

The powder X-ray diffraction patterns presented herein were collected by standard techniques. The radiation was CuK$_\alpha$ radiation. The peak heights and the positions, as a function of 2θ where θ is the Bragg angle, were read from the relative intensities of the peaks (adjusting for background), and d, the interplanar spacing corresponding to the recorded lines, can be calculated.

Processes Using SSZ-99

SSZ-99 is useful as an adsorbent for gas separations. SSZ-99 can also be used as a catalyst for converting oxygenates (e.g., methanol) to olefins and for making small amines. SSZ-99 can be used to reduce oxides of nitrogen in a gas streams, such as automobile exhaust. SSZ-99 can also be used to as a cold start hydrocarbon trap in combustion engine pollution control systems. SSZ-99 is particularly useful for trapping $C_3$ fragments.

EXAMPLES

The following illustrative examples are intended to be non-limiting.

Example 1

Preparation of As-Synthesized SSZ-99

A Teflon liner was charged with sodium silicate, 1 N NaOH, a FAU zeolite ($SiO_2/Al_2O_3$ mole ratio=5) and a methylethyldiisopropylammonium hydroxide solution. The composition of the reaction mixture, in terms of mole ratios, is reported in Table 7.

TABLE 7

| | |
|---|---|
| $SiO_2/Al_2O_3$ | 30 |
| $Q/SiO_2$ | 0.15 |
| $OH/SiO_2$ | 0.8 |
| $H_2O/SiO_2$ | 30 |

The Teflon liner was then capped and sealed within a steel Parr autoclave. The autoclave was placed on a spit within a convection oven at 135° C. The autoclave was tumbled at 43 rpm for 6 days in the heated oven. The autoclave was then removed and allowed to cool to room temperature. The solids were then recovered by filtration and washed thoroughly with deionized water. The solids were allowed to dry at room temperature.

The powder XRD pattern of the resulting product is shown in FIG. 1.

Elemental analysis indicated the product contained 30.8% Si and 7.89% Al.

Example 2

Calcination of SSZ-99

Figure 2:
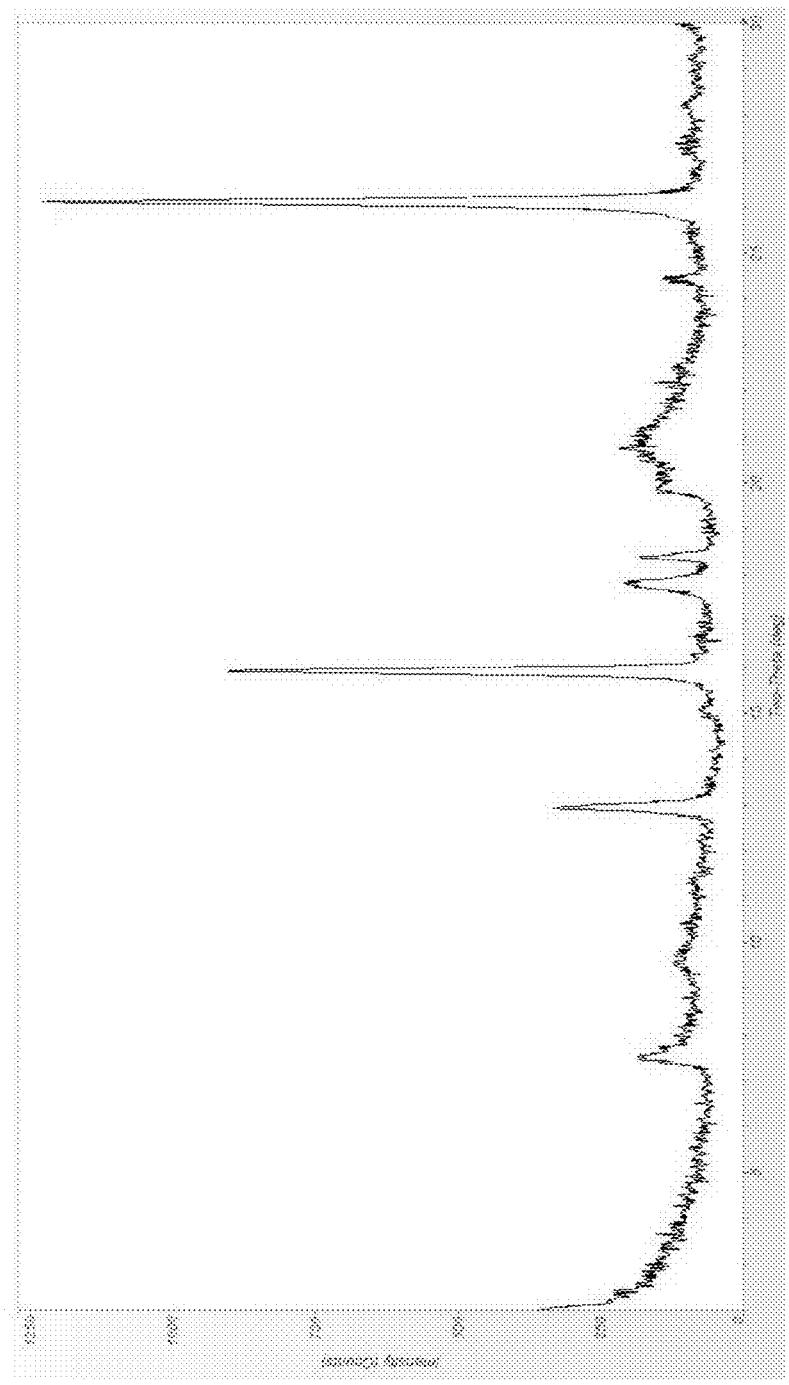
FIG. 2 is a powder XRD pattern of the calcined molecular sieve prepared in Example 2.

The resulting product was calcined inside a muffle furnace under a flow of air heated to 595° C. at a rate of 1° C./minute and held at 595° C. for 5 hours, cooled and then analyzed by powder XRD. The powder XRD pattern of the resulting product is shown in FIG. 2. The powder XRD pattern indicates that the material remains stable after calcination to remove the organic SDA.

Example 3

Micropore Volume Analysis

Calcined SSZ-99 was subjected to a micropore volume analysis using $N_2$ as adsorbate and via the BET method. The zeolite exhibited a considerable void volume with a micropore volume of 0.17 $cm^3/g$.

Calcined SSZ-99 exhibited no uptake of n-hexane at room temperature indicating that SSZ-99 is a small pore molecular sieve (i.e., a molecular sieve having a pore size of from 3 Å to less than 5.0 Å).

Example 4

Ammonium-Ion Exchange of SSZ-99

The $Na^+$ form of calcined SSZ-99 was converted to the $NH_4^+$ form of SSZ-99 by heating the material in an aqueous solution of $NH_4NO_3$ (typically, 1 g of $NH_4NO_3$/1 g of SSZ-99 in 20 mL of $H_2O$) at 95° C. for 2-3 hours. The mixture was then filtered and the step was repeated as many times as desired (usually 2-3 times). After filtration, the obtained $NH_4^+$-exchanged product was washed with deionized water and air dried. The $NH_4^+$ form of SSZ-99 can be converted to the $H^+$ form by calcination to 540° C.

Example 5

Constraint Index Test

The $H^+$ form of SSZ-99 prepared per Example 4 was pelletized at 4 kpsi, crushed and granulated to 20-40 mesh. A 0.6 g sample of the granulated material was calcined in air at 540° C. for 4 hours and cooled in a desiccator to ensure dryness. Then, 0.5 g of material was packed into a ¼ inch stainless steel tube with alundum on both sides of the molecular sieve bed. A furnace (Applied Test Systems, Inc.) was used to heat the reactor tube. Nitrogen was introduced into the reactor tube at 9.4 mL/min and at atmospheric pressure. The reactor was heated to about 600° F. (315.6° C.), and a 50/50 feed of n-hexane and 3-methylpentane was introduced into the reactor at a rate of 8 µL/min. The feed was delivered by an ISCO pump. Direct sampling into a GC began after 15 minutes of feed introduction.

After 15 minutes on stream (600° F.), the catalyst converted about 40% of the n-hexane feed and none of the 3-methylpentane feed, indicating that SSZ-99 is a small pore shape-selective molecular sieve.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A method for preparing molecular sieve SSZ-99, comprising:
    (a) preparing a reaction mixture containing (1) at least one source of at least one oxide of a tetravalent element; (2) one or more sources of one or more oxides selected from the group consisting of oxides of trivalent elements, pentavalent elements, and mixtures thereof; (3) at least one source of an element selected from Groups 1 and 2 of the Periodic Table; (4) hydroxide ions; (5) a methylethyldiisopropylammonium cation; and (6) water; and
    (b) subjecting the reaction mixture to crystallization condition sufficient to form crystals of the molecular sieve.

2. The method of claim 1, wherein the molecular sieve is prepared from a reaction mixture comprising, in terms of mole ratios, the following:

| | |
|---|---|
| $TO_2/X_2O_b$ | 5 to 50 |
| $M/TO_2$ | 0.01 to 1.0 |
| $Q/TO_2$ | 0.05 to 0.50 |
| $OH/TO_2$ | 0.10 to 1.0 |
| $H_2O/TO_2$ | 10 to 100 | wherein:
    (1) T is selected from the group consisting of tetravalent elements from Groups 4-14 of the Periodic Table, and mixtures thereof;
    (2) X is selected from the group consisting of trivalent and pentavalent elements from Groups 3-13 of the Periodic Table, and mixtures thereof;
    (3) b equals the valence state of X;
    (4) M is selected from the group consisting of elements from Groups 1 and 2 of the Periodic Table; and
    (5) Q is a methylethyldiisopropylammonium cation.

3. The method of claim 2, wherein T is selected from Si, Ge, and mixtures thereof.

4. The method of claim 2, wherein X is selected from B, Al, Ga, In, and mixtures thereof.

5. The method of claim 2, T is Si and X is Al.

6. The method of claim 2, wherein the molecular sieve is prepared from a reaction comprising, in terms of mole ratios, the following:

| | |
|---|---|
| $TO_2/X_2O_b$ | 5 to 50 |
| $M/TO_2$ | 0.30 to 0.80 |
| $Q/TO_2$ | 0.10 to 0.30 |
| $OH/TO_2$ | 0.30 to 0.80 |
| $H_2O/TO_2$ | 20 to 50. |

7. The method of claim 1, wherein the molecular sieve has, in its as-synthesized form, an X-ray diffraction pattern substantially as shown in the following Table:

| 2-Theta | d-Spacing, nm | Relative Intensity | Peak Broadening | P/N |
|---|---|---|---|---|
| 7.54 ± 0.20 | 1.172 | M | B | L |
| 9.71 ± 0.20 | 0.910 | W | VB | L |
| 12.94 ± 0.20 | 0.684 | W | Sh | H |
| 14.97 ± 0.20 | 0.591 | M | Sh | L |
| 15.92 ± 0.20 | 0.556 | S | Sh | H |
| 17.78 ± 0.20 | 0.499 | M | Sh | H |
| 18.40 ± 0.20 | 0.482 | W | Sh | L |
| 19.86 ± 0.20 | 0.447 | M | B | L |
| 21.26 ± 0.20 | 0.418 | S | VB | L |
| 22.51 ± 0.20 | 0.395 | W | B | L |
| 24.40 ± 0.20 | 0.365 | W | Sh | L |
| 26.10 ± 0.20 | 0.341 | VS | Sh | H |
| 27.35 ± 0.20 | 0.326 | W | B | L |
| 28.17 ± 0.20 | 0.317 | W | B | L. |

8. The method of claim 1, wherein the molecular sieve has a composition, as-synthesized and in the anhydrous state, in terms of mole ratios, as follows:

| | |
|---|---|
| $TO_2/X_2O_b$ | 5 to 50 |
| $Q/TO_2$ | 0.02 to 0.10 |
| $M/TO_2$ | 0.02 to 0.15 | wherein:
    (1) T is selected from the group consisting of tetravalent elements from Groups 4-14 of the Periodic Table, and mixtures thereof;
    (2) X is selected from the group consisting of trivalent and pentavalent elements from Groups 3-13 of the Periodic Table, and mixtures thereof;
    (3) b equals the valence state of X;
    (4) Q is a methylethyldiisopropylammonium cation; and
    (5) M is selected from the group consisting of elements from Groups 1 and 2 of the Periodic Table.

9. The method of claim 8, wherein T is selected from Si, Ge, and mixtures thereof.

10. The method of claim 8, wherein X is selected from B, Al, Ga, In, and mixtures thereof.

11. The method of claim 8, T is Si and X is Al.

* * * * *